(12) United States Patent
Harllee

(10) Patent No.: US 11,386,921 B2
(45) Date of Patent: Jul. 12, 2022

(54) READ HEAD STRESS REDUCTION

(71) Applicant: Seagate Technology LLC, Fremont, CA (US)

(72) Inventor: Peter S. Harllee, Boulder, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/039,026

(22) Filed: Sep. 30, 2020

(65) Prior Publication Data

US 2022/0101874 A1     Mar. 31, 2022

(51) Int. Cl.
*G11B 5/455*     (2006.01)
*G11B 5/012*     (2006.01)
*G11B 19/20*     (2006.01)
*G11B 27/36*     (2006.01)
*G11B 5/00*      (2006.01)

(52) U.S. Cl.
CPC .............. *G11B 5/012* (2013.01); *G11B 5/455* (2013.01); *G11B 19/20* (2013.01); *G11B 27/36* (2013.01); *G11B 2005/0018* (2013.01)

(58) Field of Classification Search
None
See application file for complete search history.

(56) References Cited

U.S. PATENT DOCUMENTS

| | | | |
|---|---|---|---|
| 5,596,458 A * | 1/1997 | Emo | G11B 5/00 360/46 |
| 5,606,470 A | 2/1997 | Shioya et al. | |
| 5,790,334 A * | 8/1998 | Cunningham | G11B 5/012 360/66 |
| 5,831,782 A | 11/1998 | Kohno et al. | |
| 6,005,725 A * | 12/1999 | Emo | G11B 5/00 360/31 |
| 6,043,946 A * | 3/2000 | Genheimer | G11B 20/18 360/53 |
| 6,201,656 B1 | 3/2001 | Go | |
| 6,952,330 B1 | 10/2005 | Riddering et al. | |
| 7,283,316 B2 | 10/2007 | Chiao et al. | |
| 7,589,928 B2 | 9/2009 | Roy et al. | |
| 8,004,942 B1 | 8/2011 | Kivits et al. | |
| 8,755,136 B1 * | 6/2014 | Ng | G11B 20/10388 360/31 |
| 2002/0065981 A1 | 5/2002 | Jenne et al. | |
| 2006/0215290 A1 * | 9/2006 | Kurtas | G11B 27/36 360/31 |
| 2010/0061207 A1 * | 3/2010 | Trantham | G11B 27/36 369/53.1 |

(Continued)

*Primary Examiner* — Tan X Dinh

(74) *Attorney, Agent, or Firm* — Kirk A. Cesari; Christian W. Best

(57) ABSTRACT

Systems and methods are disclosed for dynamically adjusting parameters used during a read operation to reduce stress on a read head. In certain embodiments, an apparatus may comprise a read head configured to read data stored to a data storage medium, and a control circuit that controls a parameter of the read head influencing the read head's ability to accurately read data. The control circuit may be configured to extend the working lifespan of the read head by monitoring a read performance of the read head, and adjusting the parameter to reduce the read performance when the read performance is greater than a first threshold.

25 Claims, 7 Drawing Sheets

(56) References Cited

U.S. PATENT DOCUMENTS

| | | | |
|---|---|---|---|
| 2010/0073805 A1* | 3/2010 | Amano | G11B 5/6064 360/75 |
| 2010/0195243 A1* | 8/2010 | Zhu | G11B 19/045 360/73.03 |
| 2010/0290328 A1 | 11/2010 | Eto et al. | |
| 2015/0117173 A1* | 4/2015 | Green | G11B 20/18 369/53.38 |
| 2016/0035383 A1 | 2/2016 | Tagami | |

* cited by examiner

READ HEAD STRESS REDUCTION

SUMMARY

In certain embodiments, an apparatus may comprise a read head configured to read data stored to a data storage medium, and a control circuit that controls a parameter of the read head influencing the read head's ability to accurately read data. The control circuit may be configured to extend the working lifespan of the read head by monitoring a read performance of the read head, and adjusting the parameter to reduce the read performance when the read performance is greater than a first threshold.

In certain embodiments, a method may comprise reading data stored to a data storage medium using a read head, controlling a parameter of the read head influencing the read head's ability to accurately read data to extend the working lifespan of the read head including: monitoring a read performance of the read head, and adjusting the parameter to reduce the read performance when the read performance is greater than a first threshold.

In certain embodiments, a memory device may store instructions that, when executed, cause a processor to perform a method comprising reading data stored to a data storage medium using a read head, and controlling a parameter of the read head influencing the read head's ability to accurately read data to extend the working lifespan of the read head. Controlling the parameter may include: monitoring a read performance of the read head, adjusting the parameter to reduce the read performance when the read performance is greater than a first threshold, adjusting the parameter to increase the read performance when the read performance is below a second threshold, and not adjusting the parameter to maintain the read performance when the read performance is neither above the first threshold nor below the second threshold.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
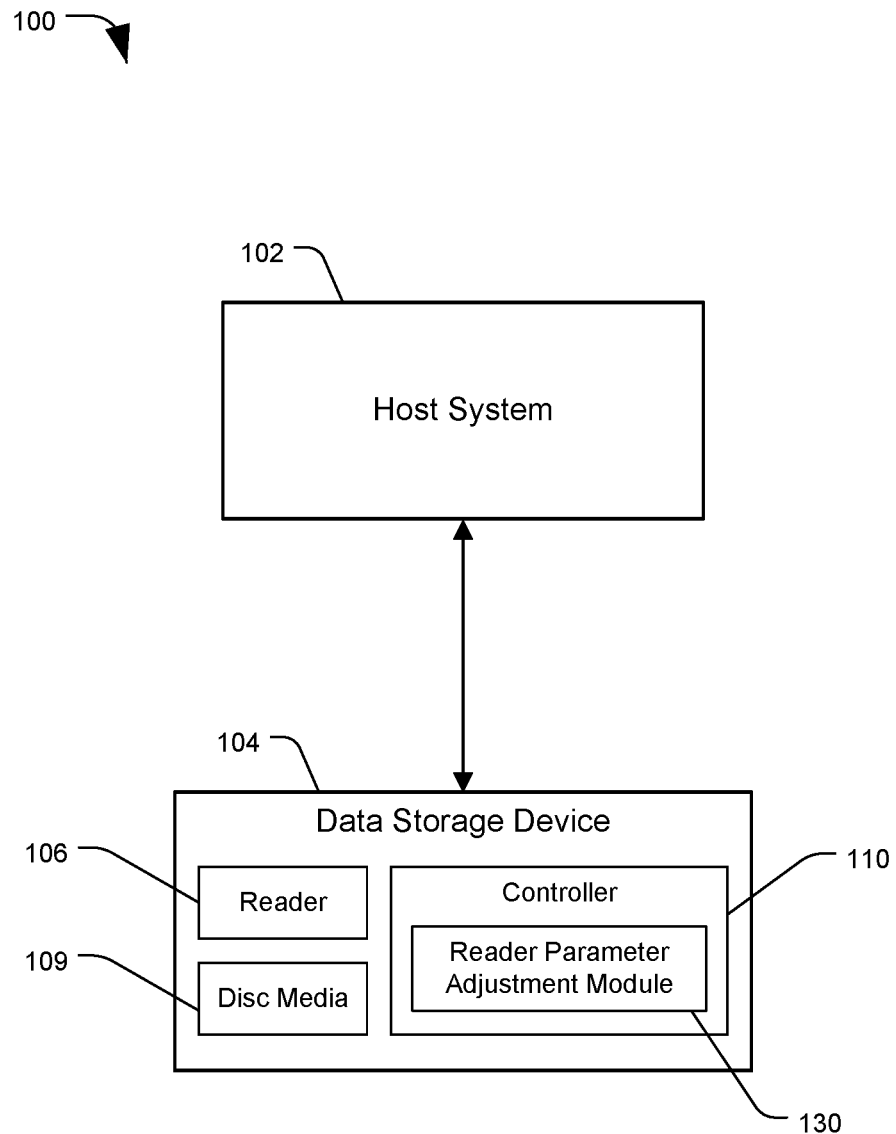
FIG. 1 is a diagram of a system configured for read head stress reduction, in accordance with certain embodiments of the present disclosure.

FIG. 1 is a diagram of a system 100 configured for read head stress reduction, in accordance with certain embodiments of the present disclosure. The system 100 may include a data storage device (DSD) 104, such as a storage drive or any other device which may be used to store or retrieve data, including a hard disc drive (HDD) or hybrid drive. As used herein, a data storage drive may refer to a device specifically adapted for data storage and retrieval to a memory internal to the drive, not including more general purpose processing devices such as computers and smart devices, although the DSD 104 and the teachings herein are not limited to such drives.

The DSD 104 may include a read head or reader 106, a disc media memory or media 109, and a controller 110. Disc media 109 may include magnetic storage discs, or other large-capacity storage media that could benefit from read head parameter adjustment as described herein. The controller 110 may be one or more processors or circuits configured to perform data access operations, such as reads or writes, to the disc media 109. Data retrieved from, or stored to, the disc media 109, may be processed via the controller 110, a read/write (R/W) channel, or other elements for encoding or decoding data, error correction, or other processing.

The system 100 may include a host device 102, which may also be referred to as the host system, host computer, or simply 'host'. The host 102 can be one or more server-class computers, desktop computers, laptop computers, workstations, tablet computers, telephones, music players, set top boxes, a control system of a self-driving vehicle, other electronic devices, or any combination thereof. The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing). The host 102 may issue data access requests, such as read or write requests, to the DSD 104. In response, the DSD 104 may perform data access operations on the disc media 109 via the controller 110 based on the requests.

Data may be read from the disc media 109 by positioning the reader 106 over a location on the disc media 109 where the data is stored, and using the reader 106 to detect the data stored at that location. For example, the disc media 109 may comprise a magnetic disc media, and the reader 106 may comprise a magneto-resistive (MR) read head configured to sense the magnetic fields stored to the disc 109 and convert them to signals, which signals can be processed by a R/W channel and controller 110 to obtain a data bit sequence.

Readers 106 may undergo a degradation process the longer they are used. As wear is put on the reader 106, its ability to accurately read data from the disc 109 may deteriorate, which can lead to more read errors, unrecoverable data, or complete reader failure, thereby reducing the performance and overall useful life of the DSD 104. Various settings or parameters may affect the ability of a read head 106 to read data from the disc 109, but high performance settings may also contribute to or accelerate reader 106 degradation. One example includes the bias settings applied to the read head, where "bias" or "bias setting" my refer to a current bias or voltage bias. A bias setting applied to the reader element 106 can affect the reader's ability to detect and convert a magnetic field from the disc 109 into a read signal. However, the bias can also generate heat in the reader 106 and degrade its performance over time. Similarly, the fly height of a slider, a structure supporting the read head 106 and write head, over the disc 109 surface can affect the reader's ability to detect the magnetic field. Generally, a lower fly-height may allow more precise reading. However, a low fly height may also lead to more impacts of the slider and read head 106 on the disc 109 surface, and some methods of keeping a low fly height may generate heat that can damage the reader 106, both factors degrading the life expectancy of the read head 106. As used herein, "lower" or "low" settings may refer to settings for the read head 106 that may reduce its ability to accurately read data relative to a maximum-performance baseline, but that may also reduce stress and extend the expected lifespan of the read head 106. Conversely, "higher" or "high" settings may refer to settings for the read head 106 at or towards a maximum-performance baseline, which may improve the reader's 106 ability to accurately read data at the expense of greater stress. The settings may also be referred to as "durability-focused" and "performance-focused."

The components of the DSD 104 may undergo certification testing during a manufacturing process. This may include determining the reader's 106 capacity to read data from the disc 109 using various settings. This one-time testing may be used to establish a baseline for the setting used for the read head 106, such as the bias applied to the read element during operation, and the fly height for the read head 106. This baseline may be fixed for the life of the DSD 104. However, the baseline may be set to allow the read head 106 to read difficult data segments within the error correction capabilities of the DSD 104. During normal read operations of data that is not difficult to read, the baseline parameters may be more stringent than necessary to read the data, and can therefore put unnecessary wear on the reader 106.

Accordingly, the DSD 104 may include a reader parameter adjustment module (RPAM) 130. The RPAM 130 may adjust the parameters or settings used for the reader 106 based on current read performance or an anticipated workload. For example, the RPAM 130 may monitor parametrics or statistics relating to a read operation (e.g. an amount of bits-in-error or a bit error ratio (BER) during a read, a number of read retries, a number of detector iterations for the bit pattern to converge, or other parameters) to determine a difficulty of the data being read. If the difficulty is low, the RPAM 130 may lower or reduce the baseline settings to reduce stress on the reader 106. If the difficulty is high, the RPAM 130 may increase the current settings, or reset them to the baseline. The RPAM 130 may be one or more processors, controllers, or other circuits, or it may be a set of software instructions that, when executed by a processing device, perform the functions of the RPAM 130. In some embodiments, the RPAM 130 may be part of the controller 110, or executed by the controller 110, or the RPAM 130 may be incorporated into other components or a stand-alone component of the DSD 104. An example embodiment of system 100, including a more detailed diagram of DSD 104, is depicted in FIG. 2.

Figure 2:
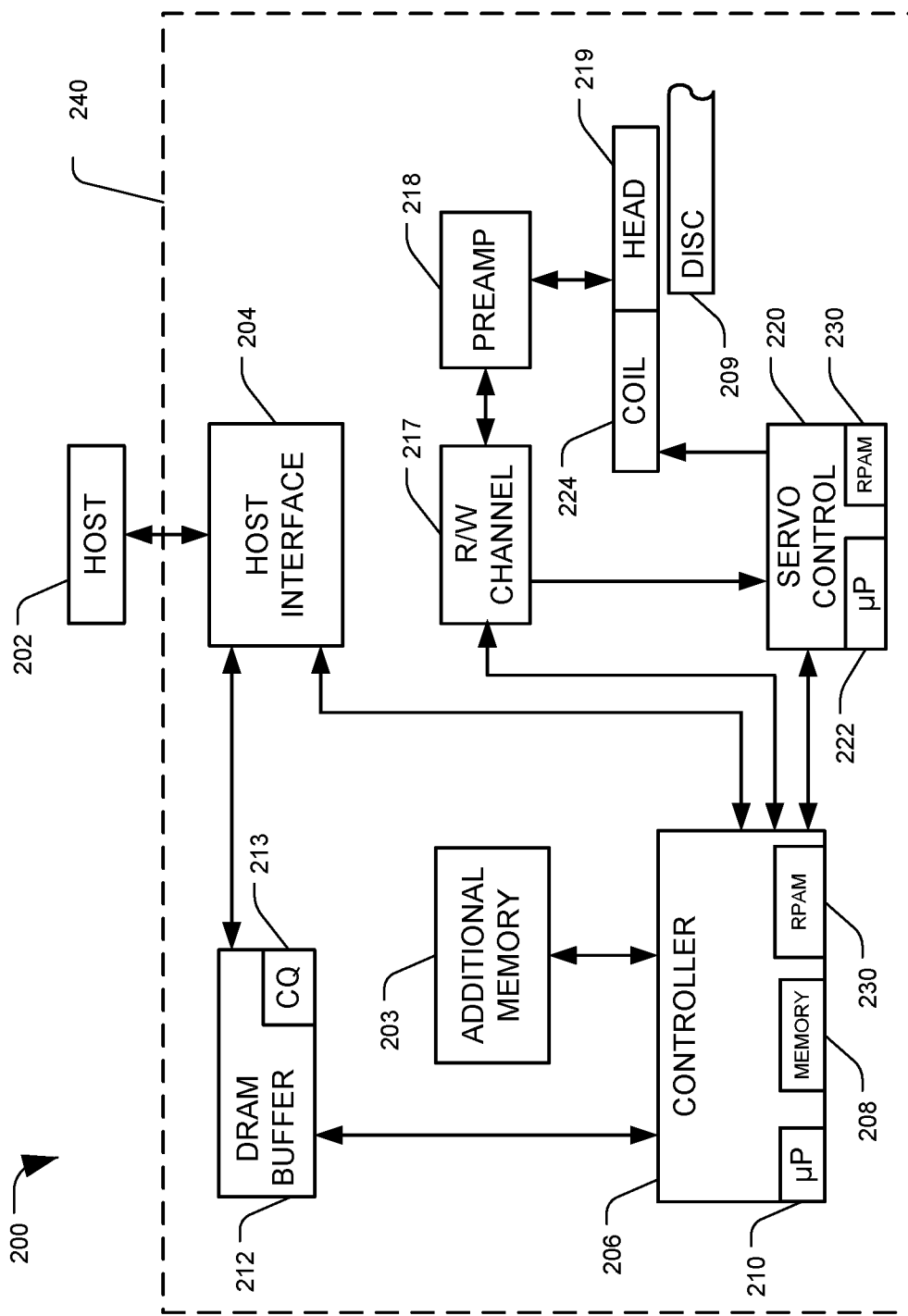
FIG. 2 is a diagram of a system configured for read head stress reduction, in accordance with certain embodiments of the present disclosure.

FIG. 2 is a diagram of a system, generally designated 200, configured for read head stress reduction, in accordance with certain embodiments of the present disclosure. Specifically, FIG. 2 provides a functional block diagram of an example data storage device (DSD) 200, which may be an example of the DSD 104 of FIG. 1. The DSD 200 may also be referred to as hard disc drive (HDD) 200, according to some embodiments. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB (universal serial bus), IEEE (Institute of Electrical and Electronics Engineers standard) 1394, Compact Flash, SATA (Serial AT Attachment), eSATA (External SATA), PATA (Parallel AT Attachment), SCSI (Small Computer System Interface), SAS (Serial Attached SCSI), PCIe (Peripheral Component Interconnect Express), Fibre Channel, Ethernet, or Thunderbolt, among others. The interface 204 may include a connector that allows the DSD 200 to be physically removed from the host 202. The DSD 200 may have a casing 240 housing the components of the DSD 200.

The buffer 212 can temporarily store data during read and write operations, and can include a command queue (CQ) 213 where multiple operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. The controller may execute firmware (FW) (e.g. instructions stored to a memory, such as additional memory 203) to control the operations of the DSD 200. The controller 206 may control data access operations, such as reads and writes, to one or more memories, such as disc memory 209, additional memory 203, or any combination thereof. For example, additional memory 203 may include volatile memory such as dynamic random access memory (DRAM) or static RAM (SRAM), nonvolatile solid state memory such as NAND flash memory, read-only memory (ROM), or other memory types. The additional memory 203 can function as a working memory for storing temporary data, a cache to store recently or frequently read or written data, or data likely to be read soon, or for other temporary data storage. Additional memory 203 may also function as main long-term storage instead of or in addition to disc(s) 209. A DSD 200 containing multiple types of nonvolatile storage mediums, such as a disc(s) and flash, may be referred to as a hybrid storage device. The memory 208 may similarly include DRAM, SRAM, or similar volatile memory, and may store FW instructions during device operation, cached data, or other information.

The DSD 200 can include a read-write (R/W) channel 217, which can encode data during write operations and reconstruct user data retrieved from a memory, such as disc(s) 209, during read operations. A preamplifier circuit (preamp) 218 can apply write currents and read bias to the head(s) 219, and provides pre-amplification of read-back signals. Head assembly 219 may include a read head element and a write head element, and may include a slider on which the read and write elements may be mounted. A servo control circuit 220 may use servo data to provide the appropriate current to the coil 224, sometimes called a voice coil motor (VCM), to position the head(s) 219 over a desired area of the disc(s) 209 by moving an adjustable actuator arm on which the head(s) 219 are mounted. The controller 206 can communicate with a processor 222 of the servo controller 220 to move the head(s) 219 to the desired locations on the disc(s) 209 during execution of various pending commands in the command queue 213.

The DSD 200 may include a reader parameter adjustment module (RPAM) 230. The RPAM 230 may be a processor, controller, or other circuit, or it may be a set of software instructions that, when executed by a processing device, perform the functions of the RPAM 230. In some embodiments, the RPAM 230 may be part of or executed by the controller 206, included in or executed by the servo control circuit 220, incorporated into other elements of the DSD 200, a standalone component within the DSD 200, or any combination thereof. The RPAM 230 may control operations of DSD 200 relating adjusting parameters or settings for the read head 219 during read operations, in order to lower stress on the reader 219 or to improve reading capability.

The RPAM 230 may send signals to components of the DSD 200 to control operations of the read head(s) 219. The DSD 200 may include a plurality of discs 209, with each disk having at least one corresponding read head 219. The DSD 200 may have baseline or initial settings for each head stored (e.g. in a table) to a memory accessible by RPAM 230 or other elements of the head control system, or every head may use the same initial or baseline settings. During operation of the DSD 200, the baseline settings may be applied initially for a head 219. The RPAM 230 may monitor performance of the head 219, for example by receiving metrics from the R/W channel 217, servo controller 220, or other elements. Monitored metrics may indicate how hard the head 219 is working, and may include a number of iterations (e.g. between a detector and a decoder in the R/W channel 217) for a data pattern to converge, a number of bits-in-error for a selected number of read bits (e.g. a number of bits that were corrected when the data for a sector converges), bit error ratio (BER), signal-to-noise ratio (SNR), number of read retries, or other metrics. The metrics may be evaluated or tallied for a complete write operation (which may include one or more LBA ranges), or may be evaluated on a sector-by-sector basis, with each sector being classified into categories such as "difficult" or "moderate" regarding the head's 219 ability to read them. Based on the evaluated metrics, the RPAM 230 may adjust the baseline settings, such as by reducing a fly height or increasing the bias to the reader element of the head 219 to improve read performance, or by increasing the fly height or reducing the bias to the read head 219 if read performance is within or above acceptable parameters. If a read error occurs, such as when read data fails to decode, the RPAM 230 may reset the head 219 settings to the baseline or default settings, or to a highest-performance setting, if the baseline is not the best read performance setting. The DSD 200 may have an error correction capability, referring to a number of bits-in-error that may be corrected within the R/W channel 217 or controller 206 without the need to perform read-retries. The RPAM 230 may seek to adjust the settings applied to the heads 219 in order to utilize the error correction capabilities of the DSD 200 to reduce the stress on the reader 219, without resulting in read errors. If the head 219 settings are set too high, the reader 219 undergoes more stress while the error correction capabilities of the DSD 200 are underutilized. If the reader 219 settings are set too low, the read data may fail to decode and read retries may be needed more often, reducing the performance of the DSD 200. The RPAM 230 may adjust the reader 219 settings to stay within those two extremes. For example, if a R/W channel 217 can handle up to 100 iterations when attempting to correct and decode data, the RPAM 230 may aim for maintaining approximately a 20 iteration average.

In some examples, the RPAM 230 may preemptively adjust read head 219 settings prior to a read, instead of or in addition to adjusting settings based on performance metrics during reads. If the RPAM 230 determines that a sector scheduled to be read is likely to be difficult to read, the RPAM 230 may increase settings for the head 219 to improve read performance, while if no difficult sectors are anticipated, the RPAM 230 may reduce settings. In some embodiments, the RPAM 230 may compare LBA ranges for upcoming read operations against a bad or defective sector list, which may provide metrics on sectors that have been difficult to read in the past. For example, the DSD 200 may maintain a list of sectors at which read errors have occurred (e.g. data failed to decode), or at which a threshold number of decode iterations were needed to decode the data, and may increase a counter for a sector each time a failed or difficult read occurred. If the counter exceeds a threshold, the sector may be designated as defective and the LBA address reassigned to a spare sector elsewhere. However, even before reassignment, a difficult read counter in a bad sector table may be used to evaluate whether a sector is likely to be difficult to read. In some embodiments, the DSD 200 may maintain a DOS (directed offline scan) counter for data tracks, which may be used to determine when to rewrite the data on a track due to degradation caused by writes to nearby tracks. If a target data track for an upcoming read operation has a high DOS counter (indicating the data may have degraded and will be rewritten soon), the RPAM 230 may increase settings for the reader 219, while the RPAM 230 may lower reader 219 settings for a track having a low DOS counter (e.g. when the DOS counter is below a threshold value). In some examples, different zones of a disc 209 may be written in different formats, such as some zones having a higher tracks-per-inch (TPI) or bits-per-inch (BPI) settings, or some may be written in a shingled, partially-overlapped format while other tracks are not overlapped. The RPAM 230 may evaluate the difficulty of reading a target zone of an upcoming read operation and adjust the head settings accordingly. Other examples are also possible.

The RPAM 230 may also evaluate characteristics of a workload when deciding which settings to apply for a head 219. If the workload is amenable to lower performance, where read retries may be more acceptable if an initial read attempt fails, the RPAM 230 may set lower settings for the head 219. However, if the workload would be significantly adversely affected by read retries, the RPAM 230 may apply higher settings for the read head 219. For example, the DSD 200 may determine (e.g. based on evaluating a sequence of read requests or based on indicators received from the host 202) that the host 202 is streaming data from the DSD 200, such as for media playback (e.g. video or audio streaming). Streaming data may be adversely affected by the delay caused by a read retry operation, and therefore the RPAM 230 may apply performance-focused settings for the head 219 when greater than a threshold amount of streaming read commands are pending. The RPAM 230 may likewise apply performance-focused settings when the workload at the DSD 200 is heavy, and delays caused by read retries may cause command queues 213 or buffers to overflow, or commands to time out. Conversely, if the DSD 200 has a light workload, the RPAM 230 may apply durability-focused settings for the read head 219, e.g. based on evaluating a number of pending operations in the command queue 213.

In some embodiments, the RPAM 230 may only adjust reader 219 settings for certain read operations. For example, the RPAM 230 may adjust read head 219 settings for read commands received from the host 202, while the RPAM 230 may not adjust settings for read operations generated internally by the DSD 200, such as DOS reads used when reading and rewriting data to tracks. In other embodiments, the RPAM 230 may adjust reader 219 settings for all read operations. Example embodiments of architecture and design of DSDs 200 configured for read head stress reduction are described in regards to the following figures.

Figure 3:
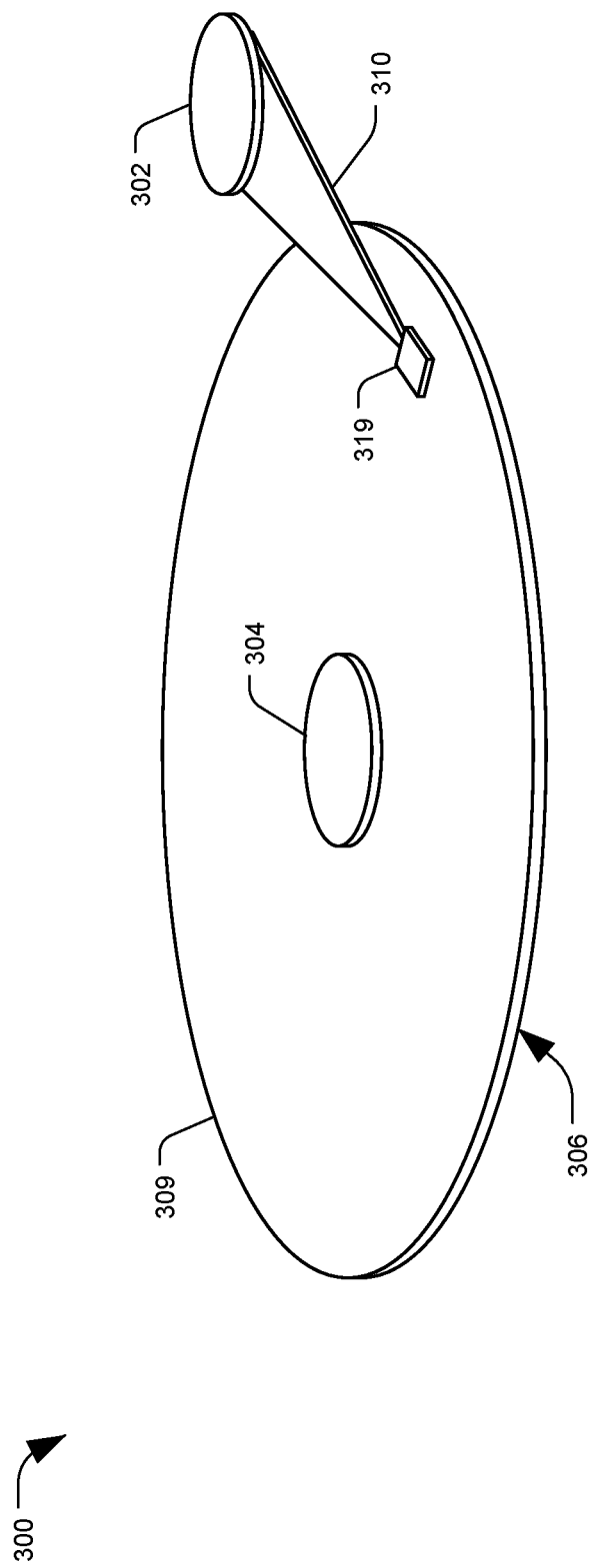
FIG. 3 is a diagram of a system configured for read head stress reduction, in accordance with certain embodiments of the present disclosure.

FIG. 3 is a diagram of a system, generally designated 300, configured for read head stress reduction, in accordance with certain embodiments of the present disclosure. Specifically, FIG. 3 provides a diagram of an example disc storage media 309, which may be an example of the disc(s) 209 of FIG. 2.

During operation, example disc 309 may spin, rotating about a central spindle 304. The surface of the disc 309 may include a plurality of concentric or spiral data tracks, from the inner diameter (ID) near the spindle 304 to the outer diameter (OD) 306. A head assembly 319 may be positioned over a desired track, and data may be read from or written to the track as the disc 309 spins below the head assembly 319. The head assembly 319 may be mounted to an adjustable actuator arm 310, which may pivot on an actuator 302 controlled by a voice coil motor and a servo control system to precisely control the position of the head 319 over a desired track. In some embodiments, a DSD may include a stack of multiple discs 309 that all spin around the same shared spindle 304. Each disc 309 in the stack (or each surface of each disc if both surfaces are used for data storage) may have a corresponding head 319 and actuator arm 310.

The head assembly 319 may include one or more read elements for reading data, write elements for recording data, and sliders for controlling a fly height of the head 319 over the surface of the disc 309. The slider may include an air-bearing that determines a passive fly height of the head 319 over the disc (e.g. in the range of 7-8 nanometers). The head 319 can also include a dynamically-adjustable fly height mechanism, allowing the fly height of the head 319 to be adjusted from the passive fly height during drive operation. Using the adjusted by the fly height mechanism, the DSD may achieve an "active" fly height clearance in the range of, e.g. 7-12 angstrom. Example adjustable fly height mechanisms may include a resistive heater or piezoelectric mechanism, which may allow for the flexing or bending of elements of the head 319 in order to move the head 319 farther from or closer to the disc 309 surface. While the active fly height mechanisms may enable a fly height closer to the disc 309 surface, and thereby allow for greater reading or writing accuracy and improved areal density, those mechanisms may also generate heat and increase the likelihood of head 319 impacts on the disc 309 surface, which may increase the stress on the reader element of the head 319. Another example architecture of a system for read head stress reduction is described in regards to FIG. 4.

Figure 4:
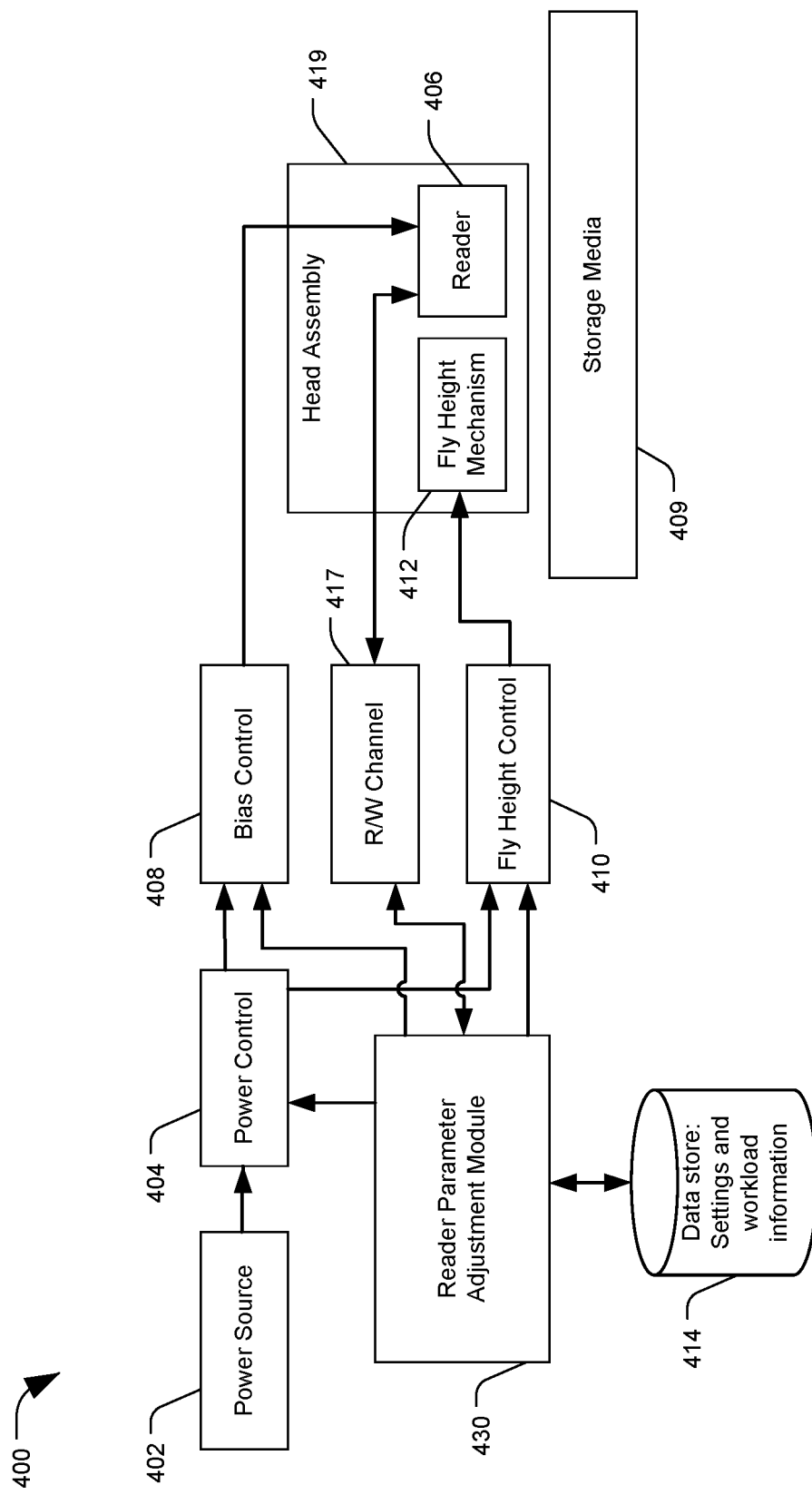
FIG. 4 is a diagram of a system configured for read head stress reduction, in accordance with certain embodiments of the present disclosure.

FIG. 4 is a diagram of a system, generally designated 400, configured for read head stress reduction, in accordance with certain embodiments of the present disclosure. Specifically, FIG. 4 provides a functional block diagram of an example data storage device (DSD) 400, which may be an example of the DSD 104 of FIG. 1. DSD 400 may include one or more modules for performing the described operations, one or more of which may be integrated onto a system on a chip (SOC) integrated circuit, or otherwise distributed within the DSD 400.

DSD 400 may include a head assembly 419, which may include a fly height mechanism 412, and a reader element 406 such as a magneto-resistive (MR) read head. The head assembly 419 may be used to position the reader 406 over a storage media 409, such as a spinning disc. The fly height mechanism 412 may be configured to dynamically adjust a fly height of the head assembly over the storage media 409. Example fly height mechanisms 412 may include a resistive heater, which may use thermal expansion to deform elements of the head assembly to adjust the fly height, or a piezo-electric element which may deform in response to an applied electrical current to adjust the fly height.

The DSD may also include a power source 402, such as a battery or A/C current, used to provide electricity to components of the DSD 400 (simplified here to components used to adjust performance settings of the reader 406). A power control module 404 may regulate and distribute power received from the power source 402 to components within the DSD 400. A bias control module 408 may control an amount of bias applied to the reader 406, thereby adjusting the reader's 406 ability to accurately read data from the storage media 409. A fly height control module 410 may control the fly height mechanism 412 via applying an electrical current, thereby increasing or reducing a distance between the head assembly 419 and the storage media 409. A read/write channel 417 can encode data during write operations, and reconstruct user data retrieved from a memory via the reader 406. In some embodiments, the bias control 408 may be incorporated into the R/W channel 417 or a pre-amplifier circuit. The DSD 400 may also include a reader parameter adjustment module (RPAM) 430, which may control systems within the DSD 400 to adjust settings of the system to reduce stress on the reader 406.

The RPAM 430 may have access to one or more data stores 414, which may include default or baseline settings or parameters for the reader 406 and fly height mechanism, such as an amount of power to apply to each element, a fly height, bias settings, or other settings. The default or baseline settings may be stored to a table or other data structure, and may be categorized based on head and zone, for example (e.g. there may be default settings for head 1, zone 2, or for head 4, zone 3). The RPAM 430 may use the stored settings for a target reader 406 of a read operation to initialize the reader 406, to reset the reader 406 if adjustments have been made, as a factor in how much to adjust settings for the reader 406 (e.g. adjustments may be calculated as a percentage of a baseline value), or to otherwise influence the settings applied or adjusted by the RPAM 430.

The data store 414 may also provide information that may be used for predictive or pre-emptive adjustment of settings for a reader 406, such as by adjusting the settings prior to performing a read operation. This data may include workload information, such as identifying how many operations are pending in a command queue, or a nature of the operations (e.g. random reads, or streaming data reads), obtained from the DSD's internal systems or from indicators received from a host. The data store 414 may include one or more tables or data structures indicating whether certain target sectors may be difficult to read, for example based on previous read attempts or elevated DOS counts. The RPAM 430 may also store information to the data store 414, such metrics or parameters associated with read operations performed by the reader 406. For example, the RPAM 430 may tally how many sectors from a read were "easy", "moderate", or "difficult" to detect and decode, a bit-error rate (BER), a number of iterations for the data to converge, or other parameters that the RPAM 430 may use to determine how well the reader 406 is performing, and may store those parameters to the data store 414 for use in adjusting the reader 406 settings.

In some embodiments, the RPAM 430 may determine that a read operation is pending, with an associated logical block address (LBA) range and corresponding physical sector targets. The RPAM 430 access the data store 414 to determine a target reader 419 and zone for the read operation, as well as the baseline bias settings and fly height settings for that reader and zone combination. The RPAM 430 may also compare the target LBA range or physical sector range to a list of unreliable or bad sectors, and may adjust the baseline reader 406 settings based on whether the read includes sectors likely to be difficult to read. The RPAM 430 may also access the data store 414 to determine one or more factors of an outstanding workload that may influence whether high-performance reliable reads are required, or if more relaxed reader 406 settings may be applied.

Based on the evaluated parameters, the RPAM 430 may set or adjust settings to be applied during the read operation, such as a bias applied to the reader 406 or a fly height of the fly height mechanism 412. The bias and fly height may be controlled based on control signals or instructions sent from the RPAM 430 to the power control module 404, the bias control module 408, the fly height control module 410, or a combination thereof.

During execution of the read operation, signals corresponding to magnetic fields detected by the reader 406 may be provided to the R/W channel 417, which may attempt to convert the signals into a bit pattern. The R/W channel may attempt to detect a bit pattern from the signals, and the bit pattern may be provided to a decoder, which can use error correction code embedded in the data to attempt to correct one or more erroneous bits. Feedback can be provided from the decoder to the detector over multiple iterations, until the bit sequences converges to a correct data sequence or fails to decode, resulting in a read error or failure. The R/W channel 417 can provide parameters associated with the read operation to the RPAM 430, such as whether the data was successfully decoded, a number of iterations performed for the data to converge, a number of bits corrected, or other information. In some embodiments, the parametrics may be provided or evaluated per sector, so that a difficulty of reading each sector of the read operation may be determined. The RPAM 430 may compare the received parameters to one or more threshold values to determine how difficult the read operation was. For example, if the parameter(s) were below a first threshold, a sector may be considered "easy", and did not require much or any error correction or decoding cycles. If the parameter(s) were between the first threshold and a second threshold, the sector may be considered "moderate" difficulty, requiring some error correction or decoding iterations, but not enough to significantly reduce performance of the DSD. If the parameter(s) were above the second threshold, then the sector may be considered "difficult", and resulted in an unacceptable number of errors or iterations to converge.

The RPAM 430 may periodically determine whether to adjust the setting for the reader 406 based on the evaluations of the parameters. For example, the RPAM 430 may determine whether to adjust the settings after every read operation, after reading a selected number of read sectors, based on a number of completed read operations, based on the passage of a selected amount of time, or at other intervals. The RPAM 430 may also adjust the settings after selected events occur, such as a read error requiring a read retry. If an evaluation of the parameters indicates that more than a first threshold number of sectors are "difficult", the RPAM 430 may increase the reader settings to improve performance. If more than a second threshold number of sectors are "easy", the RPAM may reduce the settings for the reader 406 to reduce stress. If neither threshold is exceeded, then the RPAM 430 may maintain the current reader 406 settings. Example methods for read head stress reduction are discussed below.

Figure 5:
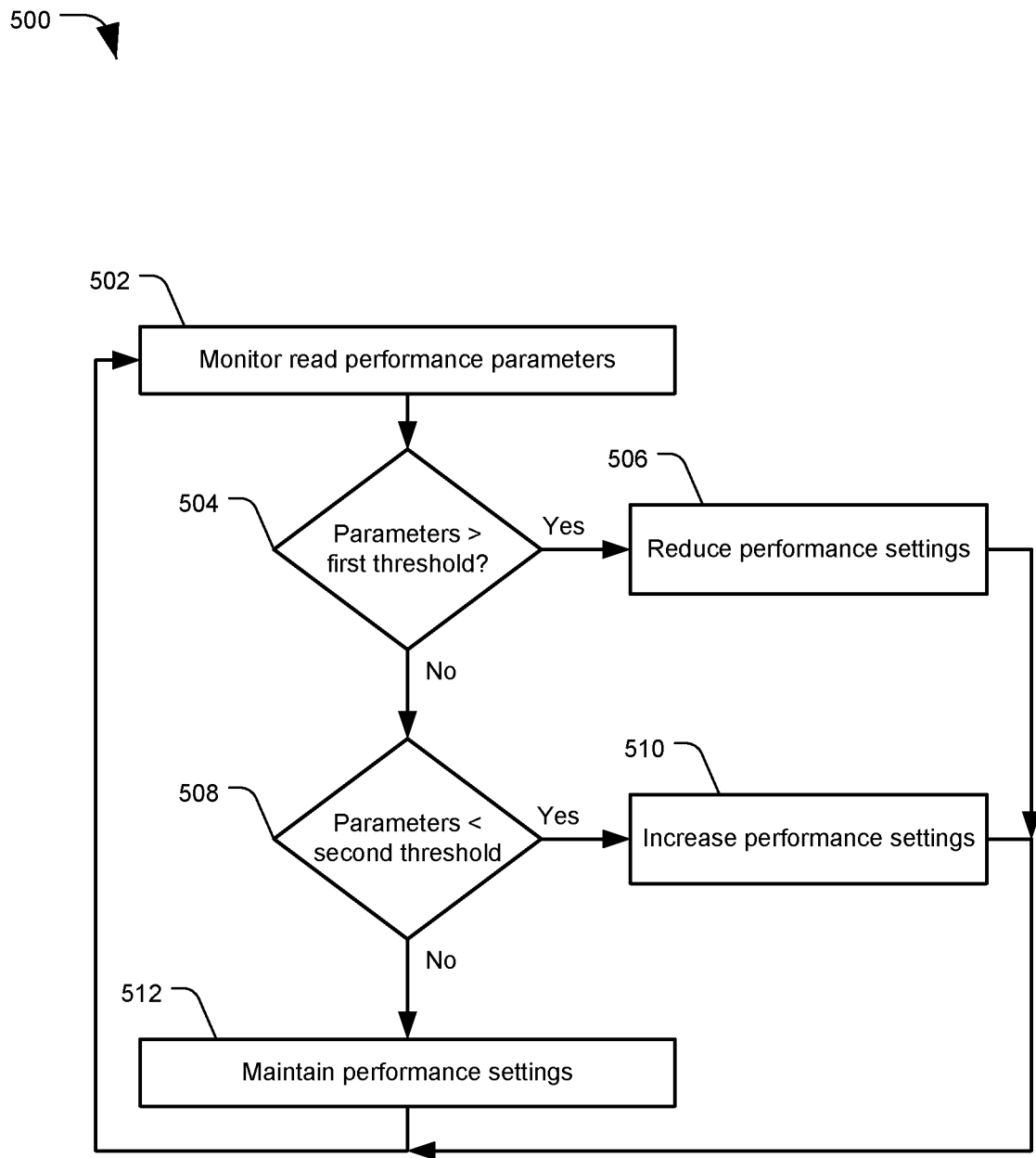
FIG. 5 depicts a flowchart of an example method for read head stress reduction, in accordance with certain embodiments of the present disclosure.

FIG. 5 depicts a flowchart of an example method 500 for read head stress reduction, in accordance with certain embodiments of the present disclosure. Method 500 may be performed by a data storage device, for example DSD 104 using controller 110 or media reader parameter adjustment module (RPAM) 130. Method 500 may include an example process for adjusting settings or parameters applied during read operations to reduce stress on a reader element.

The method 500 may include initiating monitoring read performance parameters, at 502. Read performance parameters may refer to parameters obtained during a write operation, such as bits-in-error or iterations to converge. The parameters may also include counters for how many sectors during a read were "difficult", "moderate", or "easy" to read, for example based on information like bit errors corrected while decoding the sector's data, etc. In some embodiments, read performance parameters may include characteristics of a pending read operation or workload, such as whether a read operation includes target sectors that may be difficult to read, or whether a workload may encourage applying performance-focused settings rather than durability-focused settings.

A determination may be made, at 504, whether the monitored parameter(s) are above a first threshold. Whether a parameter is "below" or "above" a threshold is exemplary in this flowchart, and depending on the parameter a lower value may be desired, or a higher value may be desired. In the case of 504, the parameters being "above" a threshold may indicate that the parameters are "good" for high-quality reads (e.g. a low bit error rate, or a low number of iterations to converge), even if the actual parameter being measured is a smaller number. In these cases, the read operation is unlikely to be or was not difficult, indicating that the performance settings for the reader may be reduced in order to reduce stress on the reader, at 506. For example, if the parameter in question was bits-in-error or iterations to converge on a completed read, a low number may indicate that the read was very successful and be "above" the first threshold, indicating that few erroneous bits needed to be corrected and the settings for the reader may be adjusted to be more durability-focused at 506. Likewise, if a pending read has few or no sectors from a 'bad sector' table, or the targeted sectors have a "difficult read" count below the first threshold, the reader performance may be reduced. If the characteristics of a pending workload indicate that the reads are not for streamed data and the quantity of pending operations is low, the reader settings may be reduced. In some embodiments, the method may include evaluating multiple parameters, which may each have their own threshold values to be compared against. The reader settings may be reduced only if all the considered parameters are above their respective threshold values, or a majority of the parameters are, or based on other weighting of the evaluated parameters. The thresholds may be set by a manufacturer (e.g. during certification testing), by a user, based on machine learning, or otherwise selected.

If the selected parameters are not above the first threshold, at 504, the method 500 may include evaluating whether the parameters are below a second threshold, at 508. The parameters being "below" the second threshold is again exemplary, and here indicates that the parameters are "bad" for high-quality reads. Whether or not a high or low number for the parameters is desirable may vary based on the parameter in question. Parameters being below the second threshold here indicates that a read operation either was, or is likely to be, difficult to read, and that the reader settings should be increased to be more performance-focused, at 510.

If the read performance parameters are neither above the first threshold, at 504, nor below the second threshold, at 508, it may indicate that a read operation was or is expected to be of moderate difficulty, which may be compensated for by the error correction capabilities of the data channel. Accordingly, the method 500 may include maintaining the current reader performance settings, at 512. Whether the reader performance settings were reduced, at 506, increased, at 508, or maintained without adjustment, at 512, the method 500 may iterate to continue monitoring read performance parameters, at 502. Another example method of read head stress reduction is described in regard to FIG. 6.

Figure 6:
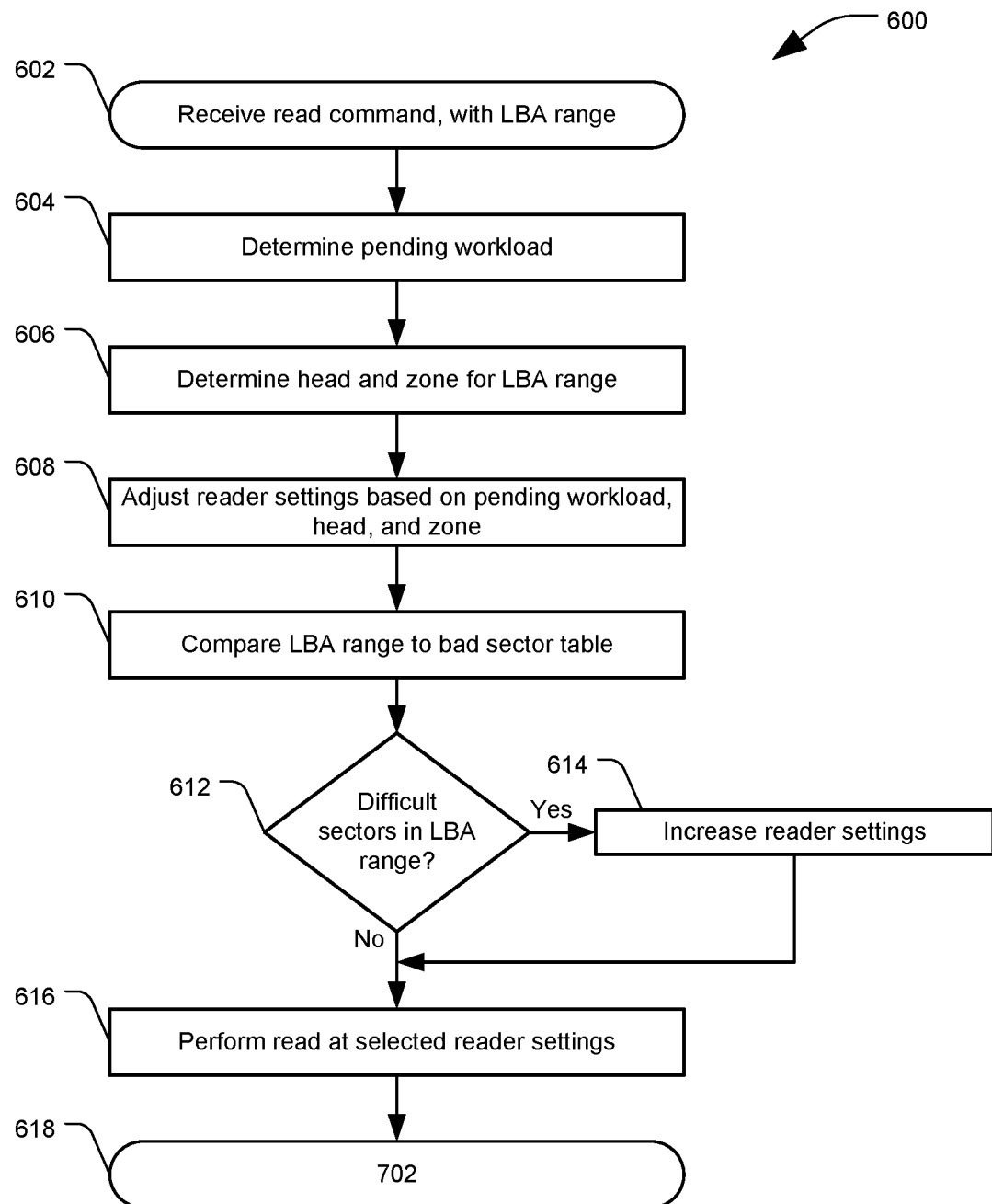
FIG. 6 depicts a flowchart of an example method for read head stress reduction, in accordance with certain embodiments of the present disclosure.

FIG. 6 depicts a flowchart of an example method 600 for read head stress reduction, in accordance with certain embodiments of the present disclosure. Method 600 may be performed by a data storage device, for example DSD 104 using controller 110 or media reader parameter adjustment module (RPAM) 130. Method 600 may include an example process for adjusting settings or parameters for a reader based on information available before a read operation.

At 602, the method 600 may include receiving a read command, which may include an LBA range of data to read. The LBA range may be mapped to physical data sectors on the storage media. The read command may be received initially at an interface of the DSD from a host device, or it may be received for execution at a storage controller (which may include an RPAM) from a command queue.

Prior to executing the read command, the method 600 may include determining a pending workload, at 604. As described herein, determining the pending workload may include evaluating a nature or characteristic of incoming commands (e.g. whether read commands, such as the current read command, are for streamed data such as reads for video playback, or are random reads or non-streamed reads where read delays may be less detrimental), determining a quantity of pending commands (e.g. whether a number of pending commands are above a threshold), or making other determinations about the workload. At 606, the method may include determining a zone of the storage media where the LBA range is stored, and a read head associated with that zone. Determining the head and zone may also include retrieving baseline or default reader settings for the identified read head and zone combination, such as by accessing a table or database of default or baseline settings for each read head. The default or baseline settings may include a bias to apply to the reader, a fly height for the read head, or other considerations. In some embodiments, rather than determining baseline or default settings for the read head and zone, the method 600 may include determining the current settings for the read head, if they have been adjusted away from the baseline or default. The current settings may be stored to a memory or one or more registers for quick access.

At 608, the method 600 may include adjusting reader settings based on the determined pending workload details and the prior settings for the head and zone. For example, the prior or current reader and zone settings may be used as a starting point, and the workload information may be used to determine whether the reader settings should be increased toward performance-focused settings, decreased toward durability-focused settings, or kept at the current settings.

The method 600 may also including comparing the LBA range to a bad sector table, at 610. A bad sector table may include information about sectors that have been difficult to read on previous read attempts, such as by requiring over a threshold number of iterations to converge or requiring re-read attempts. The LBA range may also be compared to a directed offline scan (DOS) count for the target sectors or tracks, to determine whether the target sectors are close to a DOS rewrite threshold, which may indicate the data may be degraded and difficult to read. Based on the comparisons, the method 600 may include determining whether there are difficult sectors in the LBA range, at 612. If yes, the method may include increasing the reader settings from the settings determined at 608. After the reader settings are increased, at 614, or if there are not difficult sectors in the LBA range at 612, the method 600 may include performing the read operation at the selected reader settings, at 616. Further evaluation and adjustment of the reader settings may be made at 618, based on the performed read operation, as described in further detail in FIG. 7, starting at 702

Figure 7:
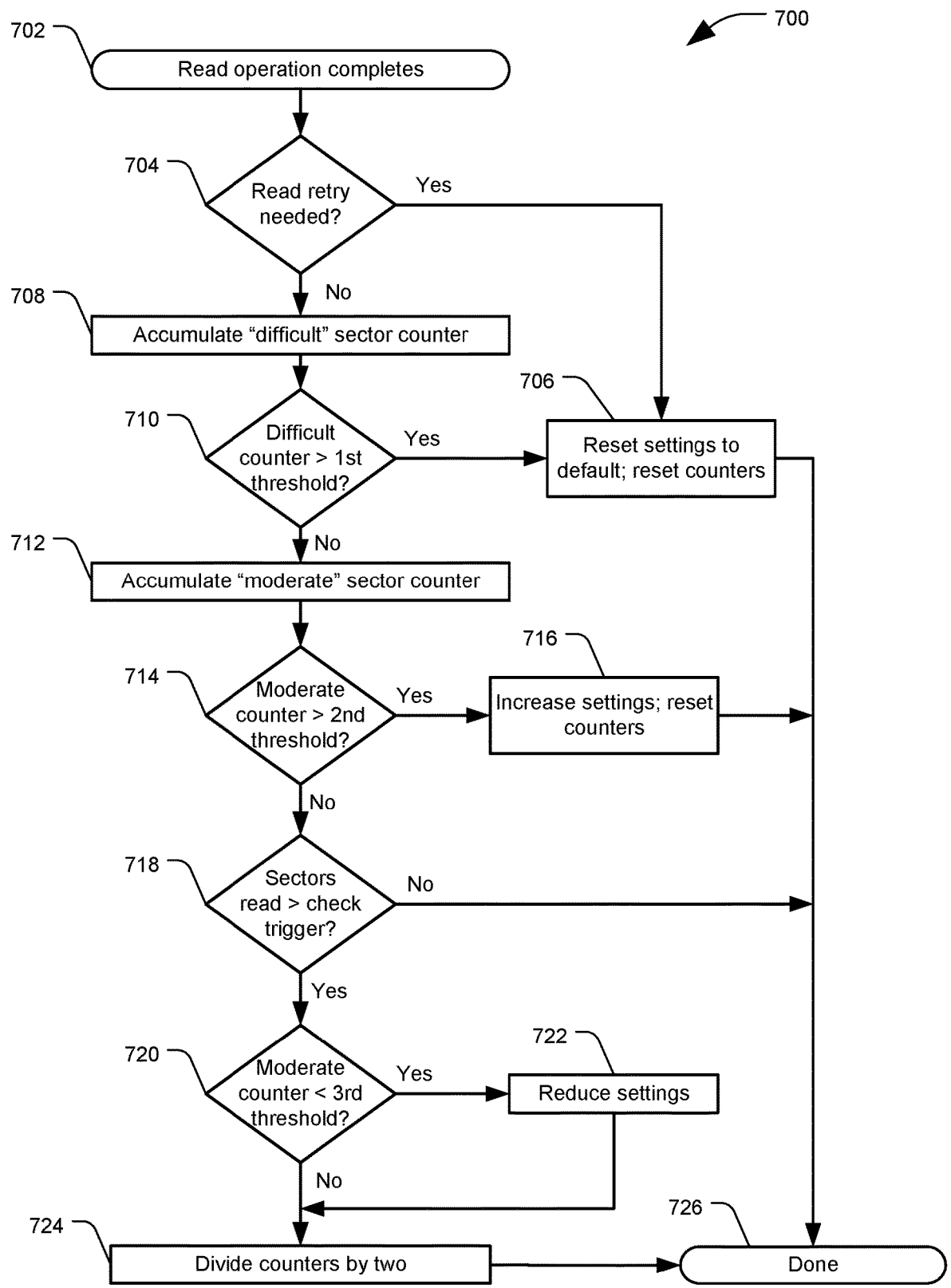
FIG. 7 depicts a flowchart of an example method for read head stress reduction, in accordance with certain embodiments of the present disclosure.

FIG. 7 depicts a flowchart of an example method 700 for read head stress reduction, in accordance with certain embodiments of the present disclosure. Method 700 may be performed by a data storage device, for example DSD 104 using controller 110 or media reader parameter adjustment module (RPAM) 130. Method 700 may include an example process for adjusting settings or parameters for a reader based on information obtained during a read operation.

At 702, the read operation may complete. Various parameters and statistics about the read operation may be obtained during the read, such as a number of iterations for data to converge at each sector, a number of bits corrected. The read statistics may be provided, e.g. from a read/write (R/W) channel to a read controller, for evaluation.

The method 700 may include determining whether the read operation failed, and a read retry is needed, at 704. If so, the reader settings may be reset to default or most stringent values, and sector counters may be reset, at 706. Sector counters may be a count of how many sectors read during the read would be classified as "difficult", "moderate", or potentially, "easy", e.g. based on number of bit errors or iterations to converge. For example, sectors that had more than a first number of errors or iterations may be classified as "difficult", sectors with less than a second number of errors or iterations may be classified as "easy", and sectors with errors or iterations between the first number and the second number may be classified as "moderate". Depending on the embodiment, the system may not accumulate counters for one or more of the difficult, moderate, or easy sectors (e.g. determinations may be made solely on a number of difficult and moderate sectors, or based on moderate and easy sectors, or based on easy and difficult sectors).

If no read retry was required, at 704, then the method 700 may include accumulating the count of "difficult" sectors from the read operation, at 708. A determination may then be made whether the counter of difficult sectors is greater than a first threshold, at 710. If so, the reader may be failing to provide a sufficiently accurate data signal at the current settings (e.g. requiring too many iterations to converge). The method 700 may therefore include resetting the reader settings to default and resetting sector counters, at 706, or alternately increasing the settings toward performance-focused values. After resetting the reader settings and resetting counters, at 706, the method may end, at 726.

When the difficult sector counter is not greater than the first threshold, at 710, the method 700 may include accumulating the "moderate" sector counter, at 712.

At 714, the method 700 may include determining whether the moderate counter is greater than a second threshold. If so, it may indicate that the reader is struggling to accurately read sectors. For example, optimizing the balance between drive performance and reader stress may include aiming for no more than a selected number of "moderate" sectors, corresponding to the second threshold. More moderate sectors may introduce noticeable delays from error correction within the channel, while too few moderate sectors may mean the reader is being subjected to more stress than necessary. A desired percentage range of sectors that are classified as "moderate" may be set via adjusting thresholds applied by the drive, during manufacturing or calibration, via user adjustment, or via other methods. For example, a target of 30% "moderate" sectors, with the majority of the rest being "easy" may be selected via setting threshold values. In another, a target of 95% moderate difficulty sectors may be set. Accordingly when the moderate sector count is above the second threshold, the method 700 may include increasing the reader settings towards a performance-focus, and resetting the sector counters, at 716, and then ending the method, at 726.

When the moderate sector counter is not greater than the second threshold, the method 700 may include determining whether a number of sectors read is greater than a check trigger number, which may trigger an evaluation of whether to reduce reader settings to reduce stress. For example, under normal operating conditions a decision to reduce reader settings may only be made every one thousand sectors read, to accumulate a substantial number of sectors counted to make an reliable average of difficult or moderate sectors. Meanwhile, increasing reader settings may be performed after any difficult read operation to ensure reliable read performance is maintained. However, in other embodiments, the check trigger may be used to determine when to both lower and increase reader settings, so long as read failures and retries are not occurring. In other embodiments, the evaluation to lower or raise reader settings may be made after every read operation, without using a check trigger counter for number of sectors read. The implementation may vary based on desired performance from the drive.

When the number of sectors read is not greater than the check trigger, at 718, the method may finish, at 726. When the number of sectors read is greater than the check trigger, the method 700 may include determining whether the number of moderate sectors is less than a third threshold, at 720. If so, it may indicate that the reader is very accurately reading sectors with minimal bit errors or iterations needed to converge, and therefore more stress is being put on the reader than necessary. Alternately, the number of "easy" sectors may be compared against a threshold value, with too many easy sectors indicating that the reader is likewise under more stress than necessary. Accordingly, the method 700 may include reducing the reader settings toward more durability-focused settings, at 722.

If the moderate sector counter is not less than the third threshold, at 720, or once the reader settings are reduced, at 722, the method 700 may include dividing the sector counters by two, at 724, and completing the method, at 726. When the sector counters are not reset, they may be carried forward between multiple read operations. By dividing the sector counters by two, at 724, it may weight newer read operations more heavily than previous read operations, giving a better indication of how the reader is currently performing. Other methods of weighting may also be used, or different denominators other than two may be used, or the sector counters may be reset after each read operation, or after a selected number of read operations, or after a selected number of read sectors. Other embodiments are also possible. The reader settings established in method 700 may be applied as the "baseline" settings used as prior to a next read, in method 600. Alternately, the approaches of method 600 or 700 may be used independently, without the other method.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g. steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a read head configured to read data stored to a data storage medium;
   a control circuit that controls a parameter of the read head influencing a read performance corresponding to the read head's ability to accurately read data, the control circuit configured to extend the working lifespan of the read head by:
   monitor the read performance of the read head; and
   adjust the parameter to reduce the read performance when the read performance is greater than a first threshold.

2. The apparatus of claim 1 further comprising:
   the parameter includes a bias setting applied to the read head to adjust the read head ability to detect the recorded data on the data storage medium.

3. The apparatus of claim 1 further comprising:
the parameter includes a fly height that controls a distance between the read head and the data storage medium.

4. The apparatus of claim 3 further comprising:
the parameter further includes a bias setting applied to the read head to adjust the read head ability to detect the recorded data on the data storage medium.

5. The apparatus of claim 1 further comprising:
the control circuit further configured to adjust the parameter to increase the read performance when the read performance is below a second threshold.

6. The apparatus of claim 5 further comprising:
the control circuit further configured to not adjust the parameter to maintain the read performance when the read performance is neither above the first threshold nor below the second threshold.

7. The apparatus of claim 1 further comprising:
the control circuit monitoring the read performance includes:
   receive statistics regarding sectors read during a read operation performed by the read head, the statistics indicating a difficulty of reading data from a sector;
   classify the sectors according to a difficulty to read the sectors based on the statistics for each sector;
   accumulate a first counter corresponding to a number of "moderate" difficulty sectors; and
   determine that the read performance is greater than the first threshold when the first counter is less than a second threshold.

8. The apparatus of claim 7 further comprising:
the control circuit monitoring the read performance includes:
   accumulate a second counter corresponding to a number of "difficult" difficulty sectors; and
   adjust the parameter to increase the read performance when the second counter is greater than a third threshold.

9. The apparatus of claim 8 further comprising:
the control circuit monitoring the read performance includes:
   maintain a third counter corresponding to a total number of sectors read; and
   compare the first counter to the second threshold when the third counter exceeds a check count value.

10. The apparatus of claim 8 further comprising:
the control circuit monitoring the read performance includes:
   divide the first counter and the second counter by two after comparing the first counter to the second threshold; and
   maintain values for the first counter and the second counter for use during a subsequent read operation.

11. The apparatus of claim 7 further comprising the statistics includes a bits-in-error number based on sector.

12. The apparatus of claim 7 further comprising the statistics includes a number of iterations between a detector and a decoder of a data channel for data to converge based on sector.

13. A method comprising:
reading data stored to a data storage medium using a read head;
controlling a parameter of the read head influencing a read performance, corresponding to the read head's ability to accurately read data, to extend the working lifespan of the read head including:
   monitoring the read performance of the read head; and
   adjusting the parameter to reduce the read performance when the read performance is greater than a first threshold.

14. The method of claim 13 further comprising:
the parameter includes a bias setting applied to the read head to adjust the read head's ability to detect the recorded data on the data storage medium.

15. The method of claim 13 further comprising:
the parameter includes a fly height that controls a distance between the read head and the data storage medium.

16. The method of claim 13 further comprising:
adjusting the parameter to increase the read performance when the read performance is below a second threshold; and
not adjusting the parameter to maintain the read performance when the read performance is neither above the first threshold nor below the second threshold.

17. The method of claim 13 further comprising:
monitoring the read performance includes:
   receiving statistics regarding sectors read during a read operation performed by the read head, the statistics indicating a difficulty of reading data from a sector;
   classifying the sectors according to a difficulty to read the sectors based on the statistics for each sector;
   accumulating a first counter corresponding to a number of "moderate" difficulty sectors;
   accumulating a second counter corresponding to a number of "difficult" difficulty sectors;
   adjusting the parameter to increase the read performance when the second counter is greater than a second threshold; and
   determine that the read performance is greater than the first threshold when the first counter is less than a third threshold,
   when the second counter is greater than a third threshold.

18. The method of claim 17 further comprising:
monitoring the read performance further includes:
   maintaining a third counter corresponding to a total number of sectors read; and
   comparing the first counter to the second threshold when the third counter exceeds a check count value.

19. The method of claim 17 further comprising:
monitoring the read performance further includes:
   maintaining values for the first counter and the second counter for use during a subsequent read operation; and
   weighting recent read operations more heavily by dividing the first counter and the second counter by another number.

20. The method of claim 17 further comprising the statistics includes a tally based on sector of at least one of:
a bits-in-error number; and
a number of iterations between a detector and a decoder of a data channel for data to converge.

21. A memory device storing instructions that, when executed, cause a processor to perform a method comprising:
reading data stored to a data storage medium using a read head;
controlling a parameter of the read head influencing the read head's ability to accurately read data to extend the working lifespan of the read head including:
   monitoring a read performance of the read head;
   adjusting the parameter to reduce the read performance when the read performance is greater than a first threshold;

adjusting the parameter to increase the read performance when the read performance is below a second threshold; and not adjusting the parameter to maintain the read performance when the read performance is neither above the first threshold nor below the second threshold.

22. The memory device of claim 21 further comprising:
the parameter includes a bias setting applied to the read head to adjust the read head's ability to detect the recorded data on the data storage medium.

23. The memory device of claim 21 further comprising:
the parameter includes a fly height that controls a distance between the read head and the data storage medium.

24. The method of claim 13 further comprising:
monitoring the read performance includes:

receiving statistics regarding sectors read during a read operation performed by the read head, the statistics indicating a difficulty of reading data from a sector;

classifying the sectors according to a difficulty to read the sectors based on the statistics for each sector;

accumulating a first counter corresponding to a number of "moderate" difficulty sectors;

accumulating a second counter corresponding to a number of "difficult" difficulty sectors;

adjusting the parameter to increase the read performance when the second counter is greater than a second threshold; and determine that the read performance is greater than the first threshold when the first counter is less than a third threshold.

25. The memory device of claim 24 further comprising:
monitoring the read performance further includes:

maintaining values for the first counter and the second counter for use during a subsequent read operation; and weighting recent read operations more heavily by dividing the first counter and the second counter by another number.

* * * * *